United States Patent [19]

Wineman

[11] Patent Number: 5,203,799
[45] Date of Patent: Apr. 20, 1993

[54] SCALE TO DETERMINE LIQUIFIED GAS AMOUNT IN SMALL CONTAINERS

[76] Inventor: Neal B. Wineman, P.O. Box 8112, Sisters, Oreg. 97759

[21] Appl. No.: 692,453

[22] Filed: Apr. 25, 1991

[51] Int. Cl.⁵ .................... G01G 1/18; G01G 21/22
[52] U.S. Cl. ..................... 177/246; 177/262
[58] Field of Search ............. 177/246, 251, 262

[56] References Cited

U.S. PATENT DOCUMENTS

| | | |
|---|---|---|
| 2,015,689 | 10/1935 | Odell . |
| 2,949,287 | 8/1960 | Linsey . |
| 3,224,516 | 12/1965 | Stelzer . |
| 3,334,698 | 8/1967 | Von Ronn ............... 177/246 |
| 3,353,615 | 11/1967 | Nekimken ............... 177/245 |
| 3,830,322 | 8/1974 | Mills . |
| 4,245,505 | 1/1981 | Baynes . |
| 4,524,617 | 6/1985 | Krehel . |
| 4,800,970 | 1/1989 | Taylor ................. 177/251 X |

Primary Examiner—George H. Miller, Jr.

[57] ABSTRACT

This invention relates to a device for determining the liquid content of small propane containers of the type used for torches, camp stoves, lanterns, heaters and the like, comprising an elongated support beam, one end of the support beam being a cradle for a propane container, a fulcrum underling the cradle, the other end of the support beam being a counterweight arm which has weight carried by the dowel and as the weight opposite the propane container is extended, the platform tilts, and the weight of the container is read on the indicator on the calibrated scale.

3 Claims, 1 Drawing Sheet

SCALE TO DETERMINE LIQUIFIED GAS AMOUNT IN SMALL CONTAINERS

This invention relates to a device for determining the weight and therefore the corresponding liquid content of small propane containers of the type used for torches, camp stoves, lanterns and heaters.

DESCRIPTION OF PRIOR ART

It is difficult under prevailing conditions to determine the amount of liquid fuel contained in a full or partially filled propane container.

Devices which measure pressure or spring activated devices which measure weight and corresponding container content are not practical or economical for use with the small hand held propane containers to which this disclosure relates. This invention is highly suited to providing a means to efficiently and easily measure the contents of small propane containers.

In summary, this invention is directed to an improvement over those discussed by providing a simple platform which can easily and accurately be used to determine the weight and corresponding liquid content of a small propane bottle.

OBJECTIVES AND ADVANTAGES

The primary objective of this invention is to make possible the determination of the liquid content of small propane containers of the type used for torches, camp stoves, lanterns and heaters.

Another objective of this invention is to very quickly and without extensive equipment accurately determine the contents of small propane containers.

Another objective of this invention is to provide a simple and inexpensive device for determining liquid content of a small propane container.

Another objective of this invention is to ascertain the liquid content of a small propane container without the need for a pressure gauge.

Another objective of this invention is to provide a device which by simple measurement will eliminate the unforeseen emptying of a small propane container during its' use and or the premature disposal of the container.

Other objectives of this invention will become apparent as the following specification progresses, reference being made to the accompanying drawings for illustration of the invention.

Figure 1:
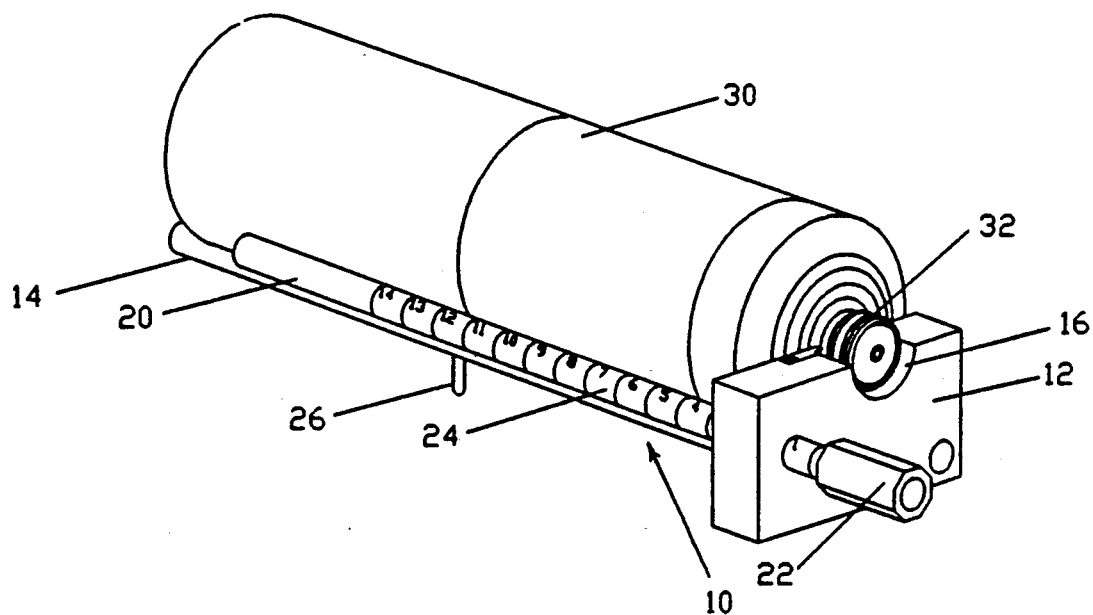
FIG. 1 is a perspective view of the device embodying the present invention, illustrating the propane fuel container positioned in the measurement stand.

| Reference Numerals In Drawings: | |
|---|---|
| 10 | Propane measurement stand |
| 12 | Cradle block |
| 14 | Support dowels |
| 16 | Container alignment slot |
| 18 | Alignment key |
| 20 | Sliding counter balance dowel |
| 22 | Counter balance weight |
| 24 | Calibrated scale |
| 26 | Fulcrum |
| 28 | Marker |
| 30 | Propane container |
| 32 | Threaded outlet valve |

DESCRIPTION AND OPERATION OF FIGURES

As shown in FIG. 1, in use, the propane container 30 is placed into the propane measurement stand 10, the threaded outlet valve 32 engages the container alignment slot 16 in block 12 and is held securely in place by alignment key 18. The body of propane container 30 rests securely on support dowels 14. The sliding counter balance dowel 20 is placed in a retracted position, counter balance weight 22 being firmly against block 12. Sliding counter balance dowel 20, and counter balance weight 22, should slowly and gently be extended until the propane measurement stand 10 tilts at transverse fulcrum 26 from resting on the base of dowels 14 and transverse fulcrum 26 to resting on the base of cradle block 12 and transverse fulcrum 26. At the time the fulcrum tips, the relative level of fuel can be determined by reading the calibrated scale 24 at the marker 28, which indicates the number of ounces or other graphic relationship remaining in the tank.

Figure 2:
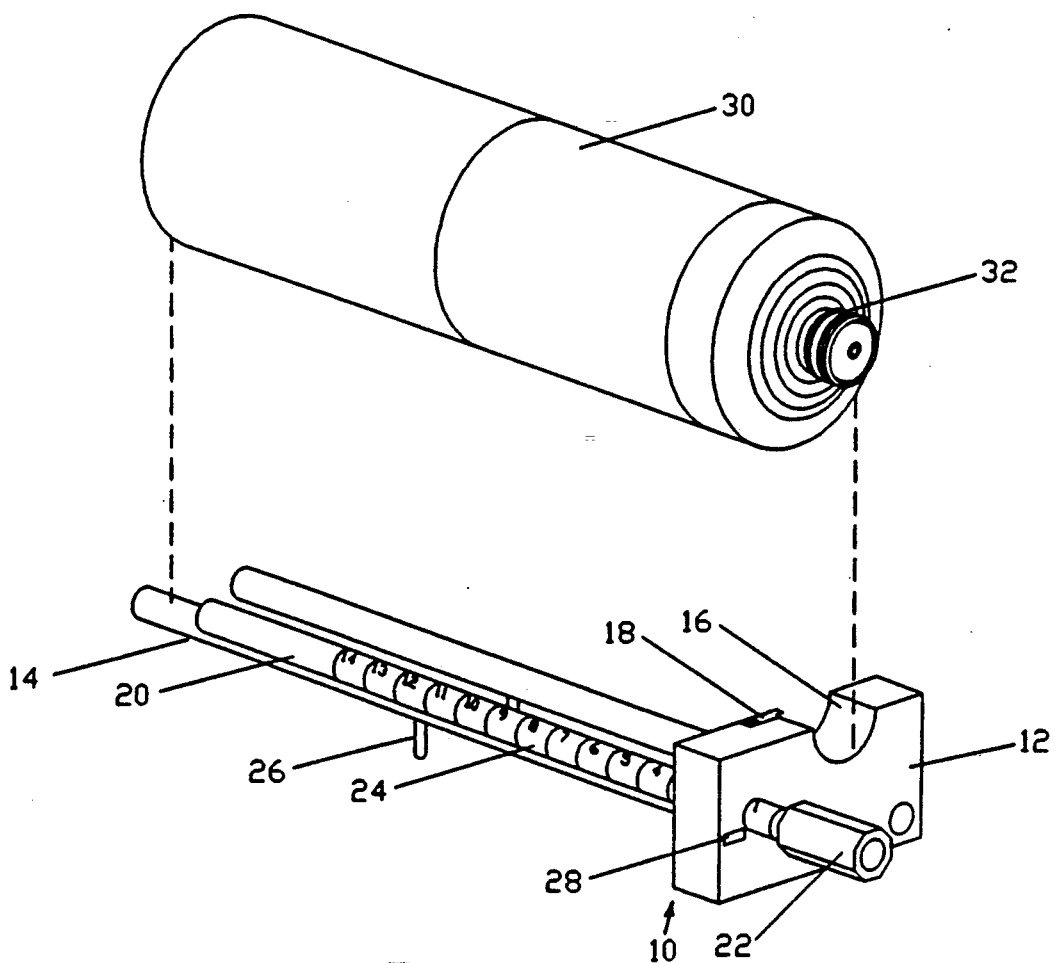
FIG. 2 is a top plane view of the measurement stand showing composite parts of the invention.

As shown in FIG. 2, a propane measuring device 10 embodying the described invention. The measuring device is represented by cradle block 12, with two support dowels 14 extending therefrom for securely supporting the propane container 30. A fulcrum is provided by inserting two small cylindrical dowels 26 into support dowels 14. Additionally, a sliding counterweight dowel possesses a graphic scale 24, which indicates numbers depicting individual ounces of measurement or can be marked to show descriptions of empty, partial, full or other graphic relationships thereof.

I claim:

1. A weight indicating scale for determining the liquid content of small propane containers comprising:
   a cradle block;
   at least two support dowels fixed to said cradle block for support of a small propane container;
   a fulcrum extending downwardly from each of said support dowels; and
   a sliding dowel with indicia is slidably positionable within said cradle block with a fixed weight attached to one end of said sliding dowel where said sliding dowel and said weight can be slidably positioned such that said weight indicating scale will rest on said fulcrums and said cradle block indicating the weight of said liquid contents of said small propane container.

2. The weight indicating scale of claim 1 where said cradle block additionally comprises a container alignment slot for support of a threaded outlet valve of said small propane container and an alignment key which engages said threaded outlet valve so that said small propane container is in a fixed lateral position.

3. The weight indicating scale of claim 1 where said sliding dowel possesses a calibrated scale which depicts ounces or like graphic measurement.

* * * * *